United States Patent
Kaneko

(10) Patent No.: US 7,408,669 B2
(45) Date of Patent: Aug. 5, 2008

(54) IMAGE FORMING SYSTEM, IMAGE FORMING APPARATUS, CONTROL METHOD THEREOF, IMAGE FORMING METHOD, AND STORAGE MEDIUM

(75) Inventor: Satoshi Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 11/028,184

(22) Filed: Jan. 4, 2005

(65) Prior Publication Data
US 2005/0111026 A1  May 26, 2005

Related U.S. Application Data

(62) Division of application No. 09/722,649, filed on Nov. 28, 2000, now Pat. No. 6,856,412.

(30) Foreign Application Priority Data
Nov. 30, 1999 (JP) ................................ 11-341397

(51) Int. Cl.
*G06F 15/00* (2006.01)
*G06F 13/12* (2006.01)
(52) U.S. Cl. ........................................ 358/1.15; 710/73
(58) Field of Classification Search ................. 358/1.15, 358/442, 468, 404, 434, 407; 399/18, 28, 399/66, 301; 710/17, 22, 25, 73; 400/54, 400/74; 714/41–42
See application file for complete search history.

(56) References Cited

U.S. PATENT DOCUMENTS

| 4,527,885 | A | 7/1985 | Ayata et al. .................. 355/3 R |
| 4,942,478 | A | 7/1990 | Yamagishi et al. ........... 358/409 |
| 5,680,221 | A | 10/1997 | Takano ........................ 358/296 |
| 5,812,747 | A | 9/1998 | Kayano et al. ............... 395/114 |
| 6,130,758 | A | 10/2000 | Funazaki ..................... 358/1.15 |
| 6,473,192 | B1 | 10/2002 | Kidani et al. ................ 358/1.14 |
| 6,856,412 | B1* | 2/2005 | Kaneko ...................... 358/1.14 |
| 2001/0038462 | A1* | 11/2001 | Teeuwen et al. ............ 358/1.15 |

FOREIGN PATENT DOCUMENTS

| EP | 0 478 355 A2 | 4/1992 |
| EP | 0 820 185 A2 | 1/1998 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

In a system that plural apparatuses mutually perform data communication, it enables to prevent decrease in productivity and to smoothly operate the entire system. In the system, when data received from an image data generation apparatus through a data communication medium is image data, acceptance from other image data generation apparatus is invalidated, and a printing process for the image data from the image data generation apparatus is performed. According as the data received from the image data generation apparatus through the data communication medium is first information output when an error occurs in the image data generation apparatus and representing this error, the invalidation of the acceptance from the other image data generation apparatus is released.

30 Claims, 10 Drawing Sheets

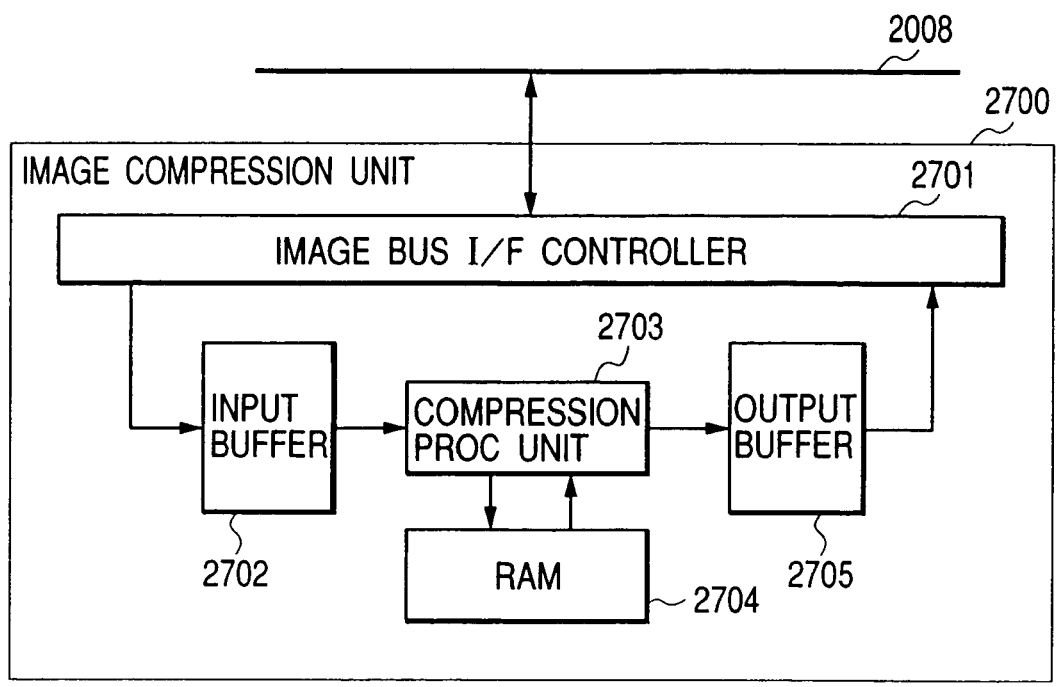
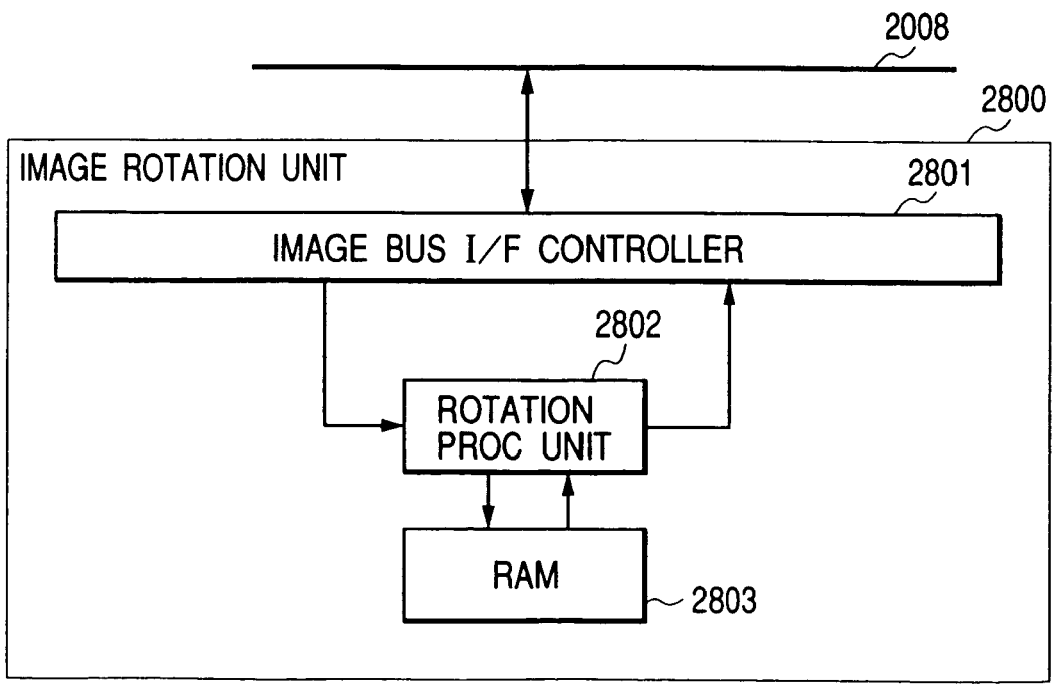

IMAGE FORMING SYSTEM, IMAGE FORMING APPARATUS, CONTROL METHOD THEREOF, IMAGE FORMING METHOD, AND STORAGE MEDIUM

RELATED APPLICATION

This application is a division of application Ser. No. 09/722,649, filed on Nov. 28, 2000, the entire disclosure of which is incorporated herein by reference.

BACKGROUND OF THE INVENTION

1. Field of the Invention

The present invention relates to an image forming apparatus capable of performing data communication with other apparatus, an image forming system, a control method thereof, an image forming method, and a storage medium.

2. Related Background Art

Recently, it has been proposed an image forming system in which plural image data generation apparatuses and plural image forming apparatuses remotely located mutually perform data communication through a transmission medium. Especially, the image forming system called a remote copying system in which the image data generation apparatus such as a scanner or the like and the image forming apparatus such as a printer or the like are connected by the transmission medium has been thought.

However, in this remote copying system, when the image data generation apparatus side starts the data communication to the image forming apparatus and then some error occurs on the image data generation apparatus side, there is a possibility for the image forming apparatus to be on standby until the error is released. Thus, when it enters once such a state, output jobs transmitted from other scanner, computer and the like can not be accepted, the standby state for execution of such the jobs continues, whereby it is anticipated that productivity of the entire system decreases.

SUMMARY OF THE INVENTION

An object of the present invention is to provide an image forming system which solves such a problem as described above, an image forming apparatus, a control method thereof, an image forming method, and a recording medium.

Another object of the present invention is to provide an image forming system in which plural apparatuses perform data communication mutually, decrease in productivity can be prevented, and a smooth operation can be achieved, an image forming apparatus, a control method thereof, an image forming method, and a recording medium.

Other objects and features of the present invention will become apparent from the following detailed description and the attached drawings.

BRIEF DESCRIPTION OF THE DRAWINGS

FIG. 7 is a block diagram showing an image compression unit in the image forming system to which the present invention is applicable;

FIG. 8 is a block diagram showing an image rotation unit in the image forming system to which the present invention is applicable;

DETAILED DESCRIPTION OF THE PREFERRED EMBODIMENTS

Hereinafter, the embodiments of the present invention will be explained with reference to the attached drawings.

Figure 1:
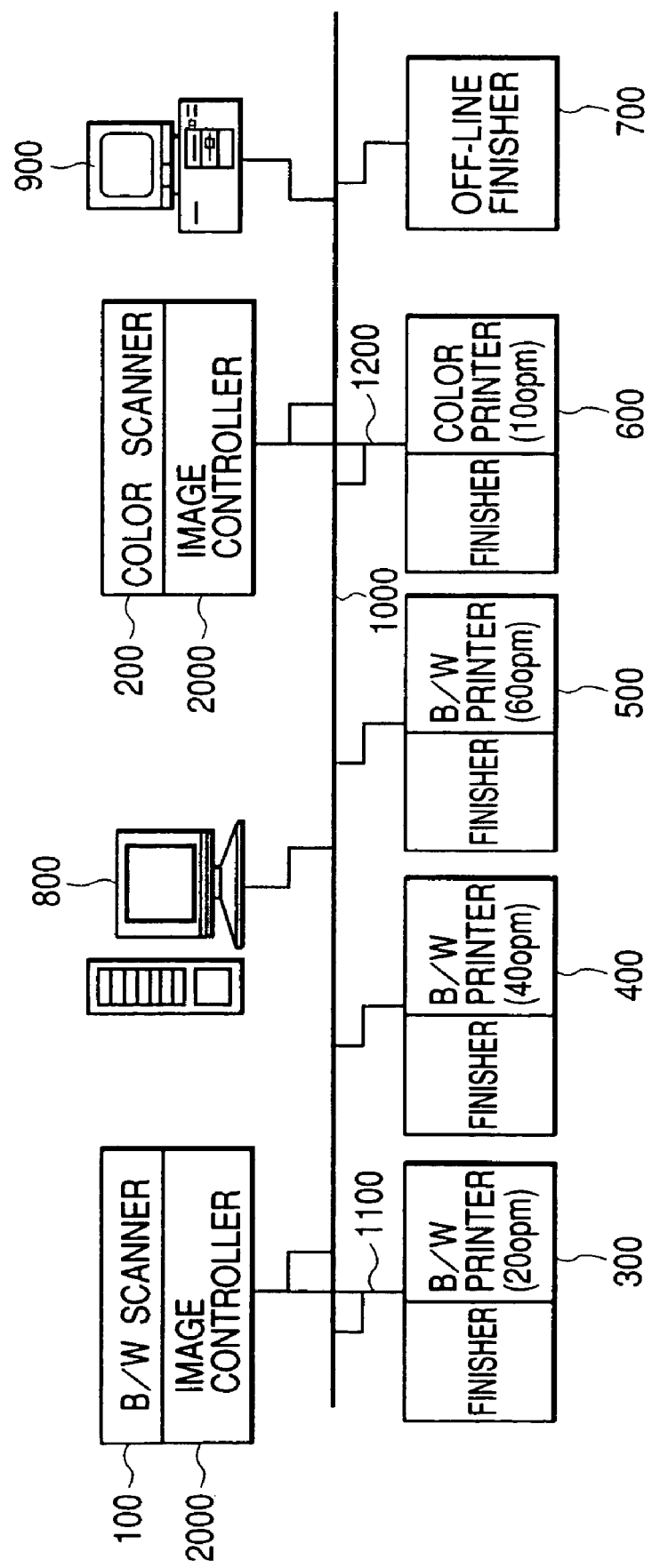
FIG. 1 is a block diagram showing an entire structure of an image forming system to which the present invention is applicable.

FIG. 1 shows an entire structure of an image forming system according to the present invention.

The image forming system includes a black and white (B/W) scanner 100 which acts as an image data generation apparatus and can read a black and white (B/W) original, a color scanner 200 which can read a color original, a server computer 800 which has a large-capacity storage, and a personal computer (PC) 900 which is used by an individual user and also has a large-capacity storage. Further, the image forming system includes, as image forming apparatuses, a low-speed (20 opm (operations per minute)) B/W printer 300, an intermediate-speed (40 opm) B/W printer 400, a high-speed (60 opm) B/W printer 500 capable of performing two-faced copying, and a color printer 600. Further, the image forming system includes an off-line finisher 700 which can performs off-line a postprocess to printed sheets. These apparatuses can mutually perform data communication through a data communication medium such as an Ethernet 1000 or the like. It should be noted that, although it is not shown in FIG. 1, the apparatuses in this system can perform data communication with other apparatus (e.g., a fax machine or the like) through a data communication medium (e.g., a telephone line).

In the embodiment, such components as above which are mutually connected by the Ethernet 1000 acting as the transmission means in the network structure constitute a LAN (local area network). Hereafter, the Ethernet 1000 is described also as the LAN 1000. Further, the B/W scanner 100 and the low-speed B/W printer 300 are connected to each other through a B/W-dedicated video bus 1100, and the color scanner 200 and the color printer 600 are connected to each other through a color-dedicated video bus 1200.

It is assumed that the basic structures of the scanners 100 and 200 are the same. Further, an image controller 2000 for performing image reading control and image transfer control is connected to each of the scanners 100 and 200 through a dedicated bus (not shown).

It is assumed that the basic structures of the image forming apparatuses 300, 400, 500 and 600 are the same, and an on-line finisher capable of performing on-line a postprocess (i.e., a sort process, a stapling process, or the like) to printed sheets is connected to each of these apparatuses. However, the detailed explanation of this finisher will be omitted.

Hereinafter, the details of the image controller 2000, the B/W scanner 100 and the intermediate-speed B/W printer 400 will be explained by way of example. It should be noted that the B/W scanner 100 and the B/W printer 400 can be used as a single-unit apparatus such as a multifunctional peripheral (MFP) on which various functions (a copying function, a fax function, a printer function, a scanner function, etc.) are installed, or can be used separately. The embodiment of the present invention is applicable to either case.

(Image Controller)

Figure 2:
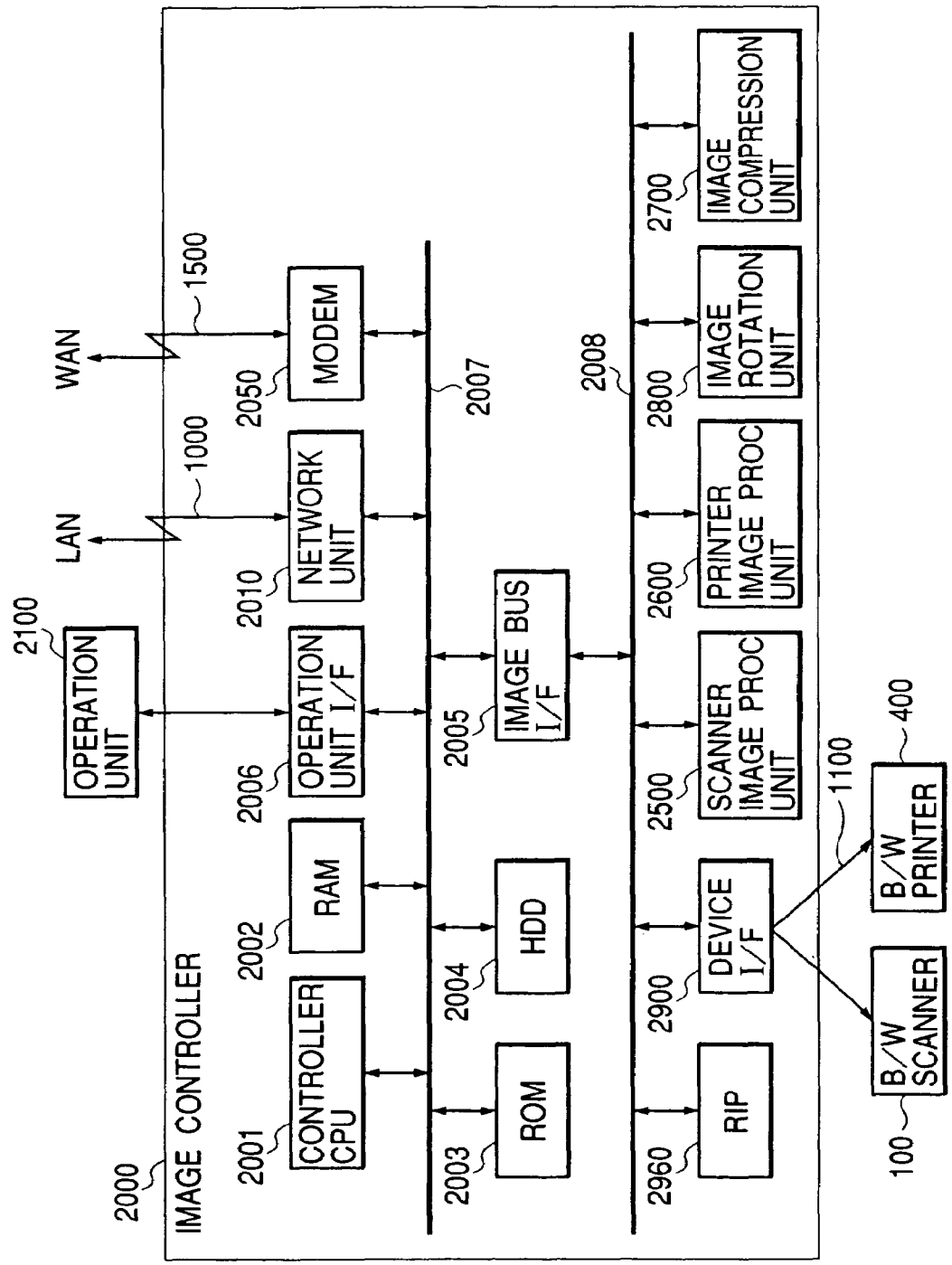
FIG. 2 is a block diagram showing an image controller in the image forming system to which the present invention is applicable.

FIG. 2 is a block diagram showing the structure of the image controller 2000.

The image controller 2000 is connected to the B/W scanner 100 acting as the image data generation apparatus and the B/W printer 400 acting as the image forming apparatus, and equally connected to the LAN 1000 and a public line or a wide area network (WAN) 1500, whereby input and output of image information and device information are controlled. The image controller 2000 can be connected to other data generation apparatus and image forming apparatus through the LAN 1000 or the WAN 1500.

In the image controller 2000, a controller CPU 2001 controls the controller 2000 as a whole, and a RAM 2002 which temporarily stores image data acts as a system working memory used when the controller CPU 2001 operates. A ROM 2003 which is a boot ROM stores a system boot program, and a hard disk drive (HDD) 2004 stores system software and various image data. Concretely, information which concerns image output speed, setting positions and the like of nodes connected on the network (LAN 1000) has been stored for each address in the HDD 2004.

An operation unit interface (I/F) 2006 which interfaces with an operation unit (a user interface (UI)) 2100 outputs image data to be displayed to the operation unit 2100. Further, the operation unit I/F 2006 functions to transfer to the controller CPU 2001 the information (e.g., execution instructions for user's desired modes such as a network scan mode, a local copying mode, a remote copying mode, etc. and information of an operation mode and the like) which is input from the operation unit 2100 by a user of this system. A network unit 2010 which is connected to the LAN 1000 inputs and outputs various information, and also a modem 2050 which is connected to the WAN 1500 inputs and outputs various information.

Such devices as above are disposed on a system bus 2007. An image bus interface (I/F) 2005 which is a bus bridge connects the system bus 2007 to an image bus 2008 which transfers image data at high speed, whereby the data structure is converted.

The image bus 2008 is the high-speed bus such as a 32-bit width PCI (peripheral component interconnect) bus or the like. On the image bus 2008, a raster image processor (RIP) 2960, a device interface (I/F) 2900, a scanner image processing unit 2500, a printer image processing unit 2600, an image rotation unit 2800, and an image compression unit 2700 are disposed. The RIP 2960 expands a PDL (page description language) code to a bit map image. The device I/F 2900 connects the B/W scanner 100 (image input apparatus) and the B/W printer 400 (image output apparatus) to the image controller 2000, and performs synchronous and asynchronous conversion to image data as described later. The scanner image processing unit 2500 corrects, processes and edits input image data as described later. The printer image processing unit 2600 performs printer correction, resolution conversion and the like to print output image data. The image rotation unit 2800 performs rotation of image data as described later. The image compression unit 2700 performs compression and decompression processes of JPEG (joint photographic experts group) method to multivalue image data, and performs compression and decompression processes of JBIG (joint bi-level image experts group) method, MMR (modified modified READ coding) method and MH (modified Huffman coding) method to binary image data, as described later.

(Image Input Apparatus (Scanner))

Figure 3:
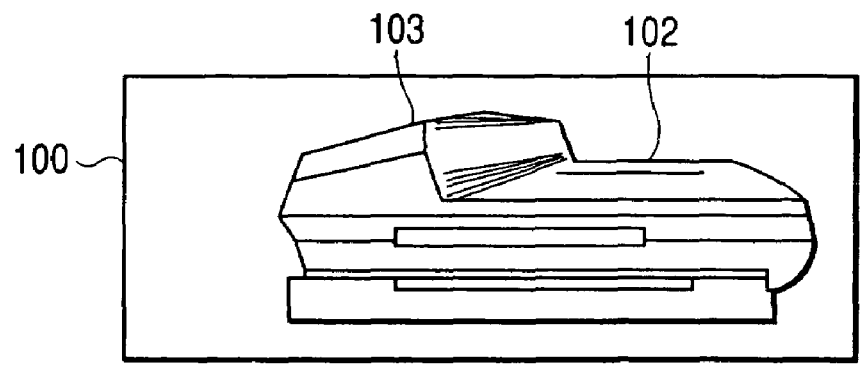
FIG. 3 is a diagram showing an appearance of an image input apparatus in the image forming system to which the present invention is applicable.

FIG. 3 is a block diagram showing the structure of the image input apparatus.

The B/W scanner 100 which acts as the image input apparatus illuminates an image on a sheet being an original, relatively moves a CCD line sensor (not shown) to the original to scan it, and then converts the scanned and read image into an electrical signal as raster image data. When the original is set to an original stacking device 103 of an automatic document feeder (ADF) 102 and an instruction to start the reading is input by the user from the operation unit 2100, the controller CPU 2001 instructs the B/W scanner 100 to cause the ADF 102 to feed the original one by one for the original image reading.

(Image Output Apparatus (Printer))

Figure 4:
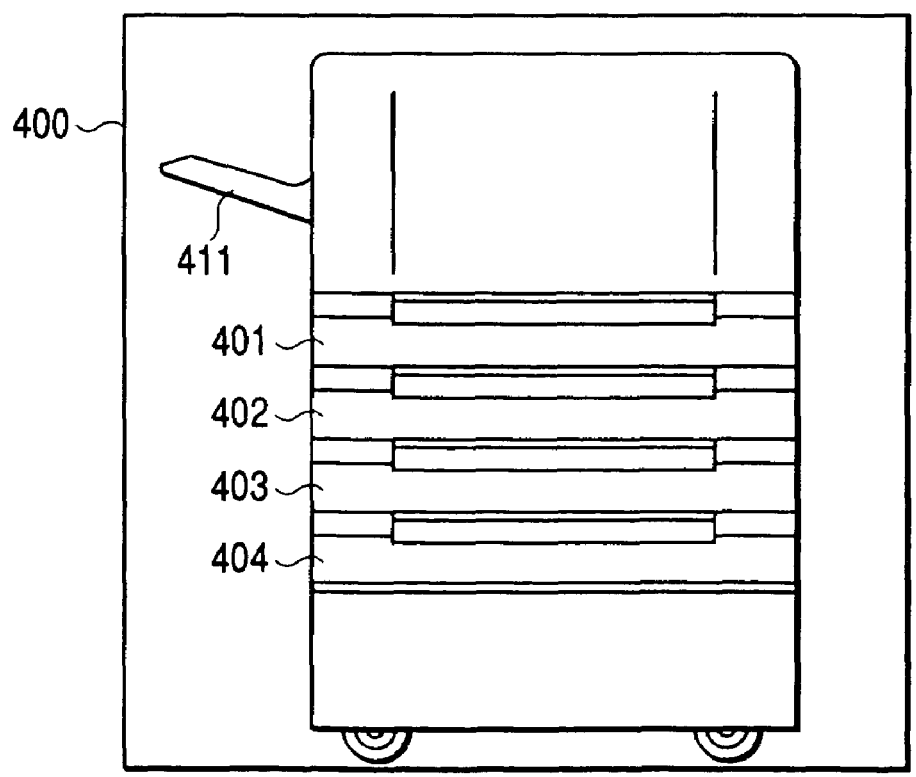
FIG. 4 is a diagram showing an appearance of an image output apparatus in the image forming system to which the present invention is applicable.

FIG. 4 is a block diagram showing the structure of the image output apparatus.

The B/W printer 400 which acts as the image output apparatus converts the electrical signal being the raster image data into an image and then records the obtained image on a sheet. As a printing method, it is possible to apply any of an electrophotographic method which uses a photosensitive drum or a photosensitive belt, an inkjet method which emits ink from a micronozzle array to directly print an image on a sheet, and the like.

The printing operation is started based on an instruction from the controller CPU 2001. The B/W printer 400 provides plural stages to be able to select different sheet sizes and directions, and sheet cassettes 401, 402, 403 and 404 corresponding to the respective stages are provided. The sheet subjected to the printing is discharged on a sheet discharge tray 411.

(Scanner Image Processing Unit)

Figure 5:
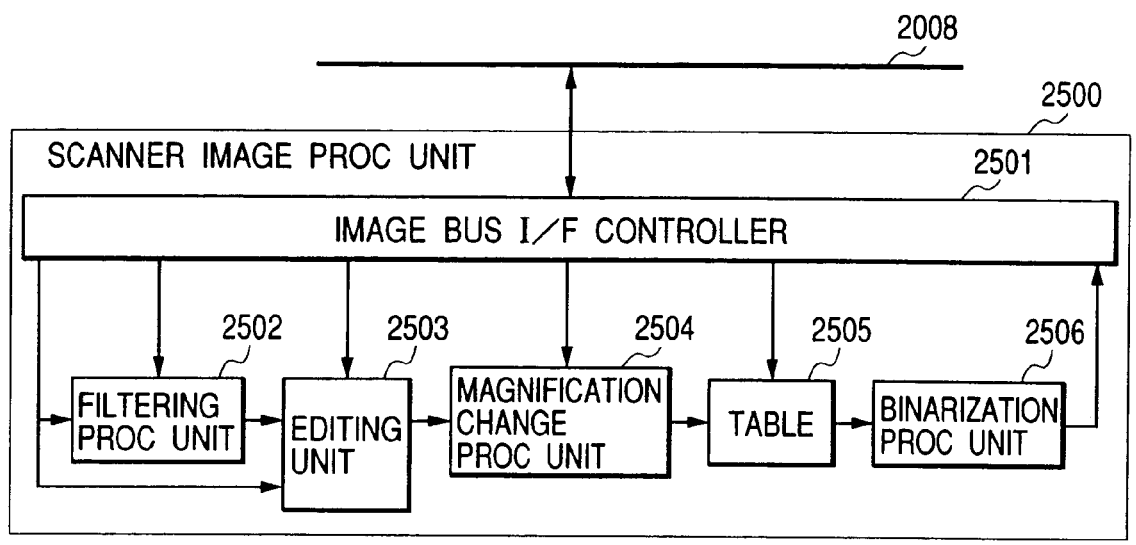
FIG. 5 is a block diagram showing an image processing unit of the image input apparatus (a scanner) in the image forming system to which the present invention is applicable.

FIG. 5 is a block diagram showing the structure of the scanner image processing unit 2500.

An image bus interface (I/F) controller 2501 which is connected to the image bus 2008 has a function to control its bus access sequence, control each device in the scanner image processing unit 2500, and generate timing of each device. A filtering processing unit 2502 has a function to perform a convolution operation by using a spatial filter.

An editing unit 2503 recognizes a closed area surrounded by a marker pen in input image data, and performs an image process such as shadow, shading, highlight or the like to the image data in the closed area. When a resolution of a read image is changed, a magnification change processing unit 2504 performs an interpolation operation to the main scan direction of a raster image and performs size enlargement and reduction. The magnification in the sub scan direction is changed by changing movement speed of an image read line sensor (not shown).

A table 2505 is used to table conversion for converting read image data (luminance data) into density data. A binarization processing unit 2505 binarizes multivalue gray scale image data in an error diffusion process and a screening process.

The image data which was processed by the scanner image processing unit 2500 is again transferred to the image bus 2008 through the image bus I/F controller 2501.

(Printer Image Processing Unit)

Figure 6:
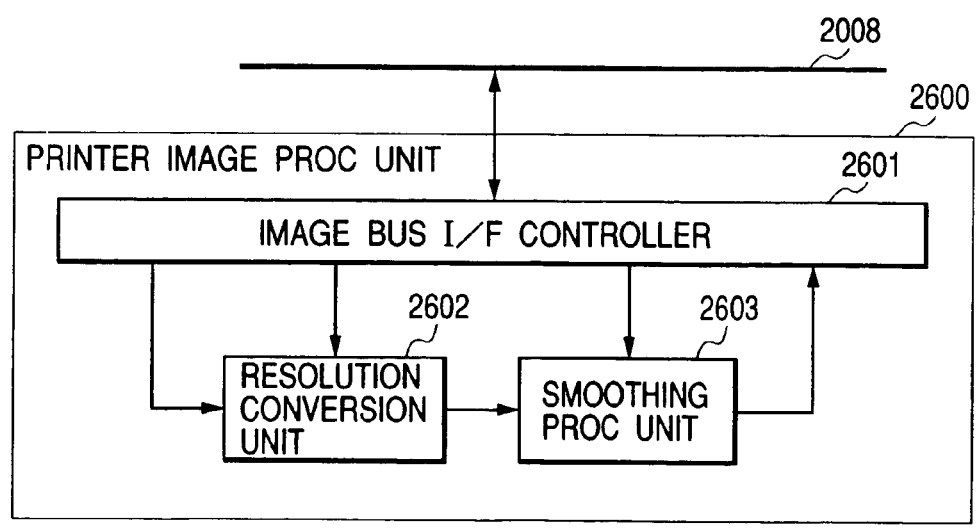
FIG. 6 is a block diagram showing an image processing unit of the image output apparatus (a printer) in the image forming system to which the present invention is applicable.

FIG. 6 is a block diagram showing the structure of the printer image processing unit 2600.

An image bus interface (I/F) controller 2601 which is connected to the image bus 2008 has a function to control its bus access sequence, control each device in the printer image processing unit 2600, and generate timing of each device. A resolution conversion unit 2602 has a function to perform resolution conversion to image data sent from the network unit 2010 or the WAN 1500 to obtain the resolution of the B/W printer 400. A smoothing processing unit 2603 performs a process to smooth a jaggy of the image data (image roughness appearing at, e.g., an oblique B/W boundary) after the resolution conversion.

(Image Compression Unit)

FIG. 7 is a block diagram showing the structure of the image compression unit 2700.

An image bus interface (I/F) controller 2701 which is connected to the image bus 2008 has a function to control its bus access sequence, control timing to exchange data between an input buffer 2702 and an output buffer 2705, and control mode setting to a compression processing unit 2703.

Hereinafter, a processing procedure of the image compression unit 2700 will be explained.

The controller CPU 2001 performs setting for image compression control to the image bus I/F controller 2701, through the image bus 2008. By this setting, the image bus I/F controller 2701 performs setting of, e.g., MMR compression, JBIG decompression and the like necessary for the image compression to the compression processing unit 2703. After then, the controller CPU 2001 again permits the image bus I/F controller 2701 to transfer the image data.

In accordance with such transfer permission, the image bus I/F controller 2701 starts the image data transfer from the RAM 2002 or each device on the image bus 2008. The received image data is temporarily stored in the input buffer 2702 and then transferred at certain speed according to an image data request of the compression processing unit 2703. At this time, it is judged at the input buffer 2702 whether or not the image data can be transferred between the image bus I/F controller 2701 and the compression processing unit 2703. Then, if judged that the image data reading from the image bus 2008 and the image writing to the compression processing unit 2703 can not be performed, it is controlled not to perform the data transfer (hereinafter, such control is called "handshaking").

The compression processing unit 2703 once stores the received image data in a RAM 2704. This is because data of plural lines are necessary according to a kind of image compression process, and the image compression for initial one line can not be performed if the image data of the plural lines are not prepared.

The image data subjected to the image compression is immediately transferred to the output buffer 2705. In the output buffer 2705, the handshaking between the image bus I/F controller 2701 and the compression processing unit 2703 is performed, and the image data is then transferred to the image bus I/F controller 2701. In the image bus I/F controller 2701, the compressed (or decompressed) image data transferred is further transferred to the RAM 2002 or each device on the image bus 2008.

Such a series of the processes in the image compression unit 2700 is repeated until a processing request from the controller CPU 2001 ends (i.e., the processes of necessary pages end) or a stop request is issued from the compression processing unit 2703 (i.e., an error in the compression or decompression occurs).

(Image Rotation Unit)

FIG. 8 is a block diagram showing the structure of the image rotation unit 2800.

An image bus interface (I/F) controller 2801 which is connected to the image bus 2008 has a function to control its bus access sequence, control mode setting or the like to a rotation processing unit 2802, and control timing to transfer image data to the rotation processing unit 2802.

Hereinafter, a processing procedure of the rotation processing unit 2802 will be explained.

The setting to control the image rotation is performed by the controller CPU 2001 to the image bus I/F controller 2801 through the image bus 2008. By this setting, the image bus I/F controller 2801 performs the setting of, e.g., an image size, a rotation direction, an angle and the like necessary for the image rotation to the rotation processing unit 2802. After then, the controller CPU 2001 again permits the image bus I/F controller 2801 to transfer the image data.

In accordance with such transfer permission, the image bus I/F controller 2801 starts the image data transfer from the RAM 2002 or each device on the image bus 2008. Here, it is assumed that the size of the data to be transferred is 32 bits, the image size for the rotation is 32×32 (bits), the image data is transferred on the image bus 2008 in the unit of 32 bits, and the image to be managed here is represented by binary data.

Figure 9:
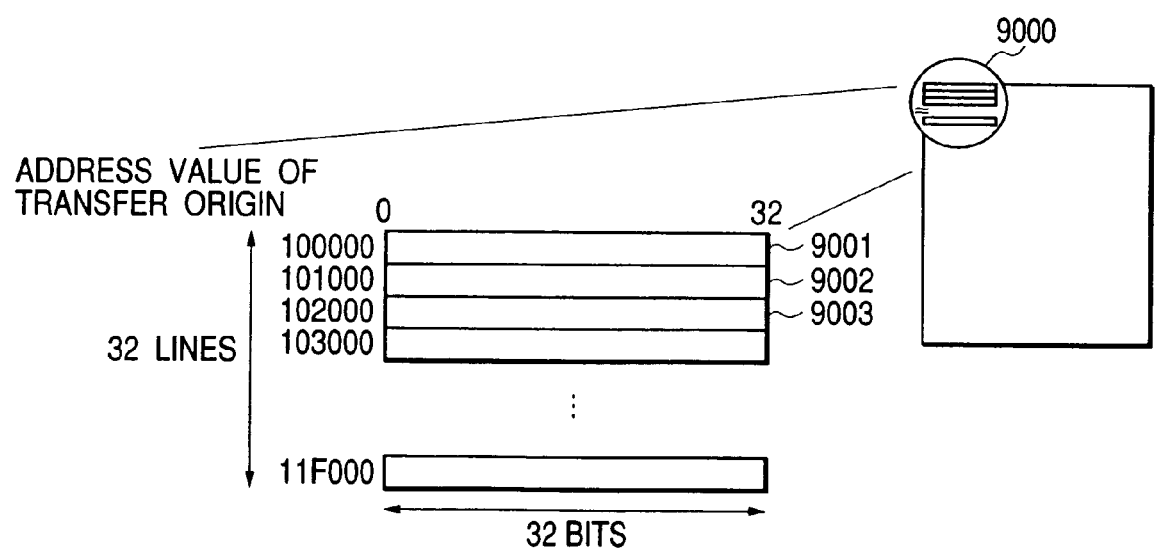
FIG. 9 is a diagram (part one) for explaining image rotation by the image rotation unit in the image forming system to which the present invention is applicable.

As above, in order to obtain the image of 32×32 (bits), it is necessary to perform the unitary data transfer 32 times, and transfer the image data from discontinuous addresses. For example, as shown in FIG. 9, it is thought that a part 9000 represents the image data of the unit of 32×32 (bits). In this unit image data 9000, addresses of the first line are "100000" to "100031", and addresses of the second line are "101000" to "101031". As for other lines, it is similar. Namely, the addresses of the unit image data 9000 are discontinuous for each line.

Figure 10:
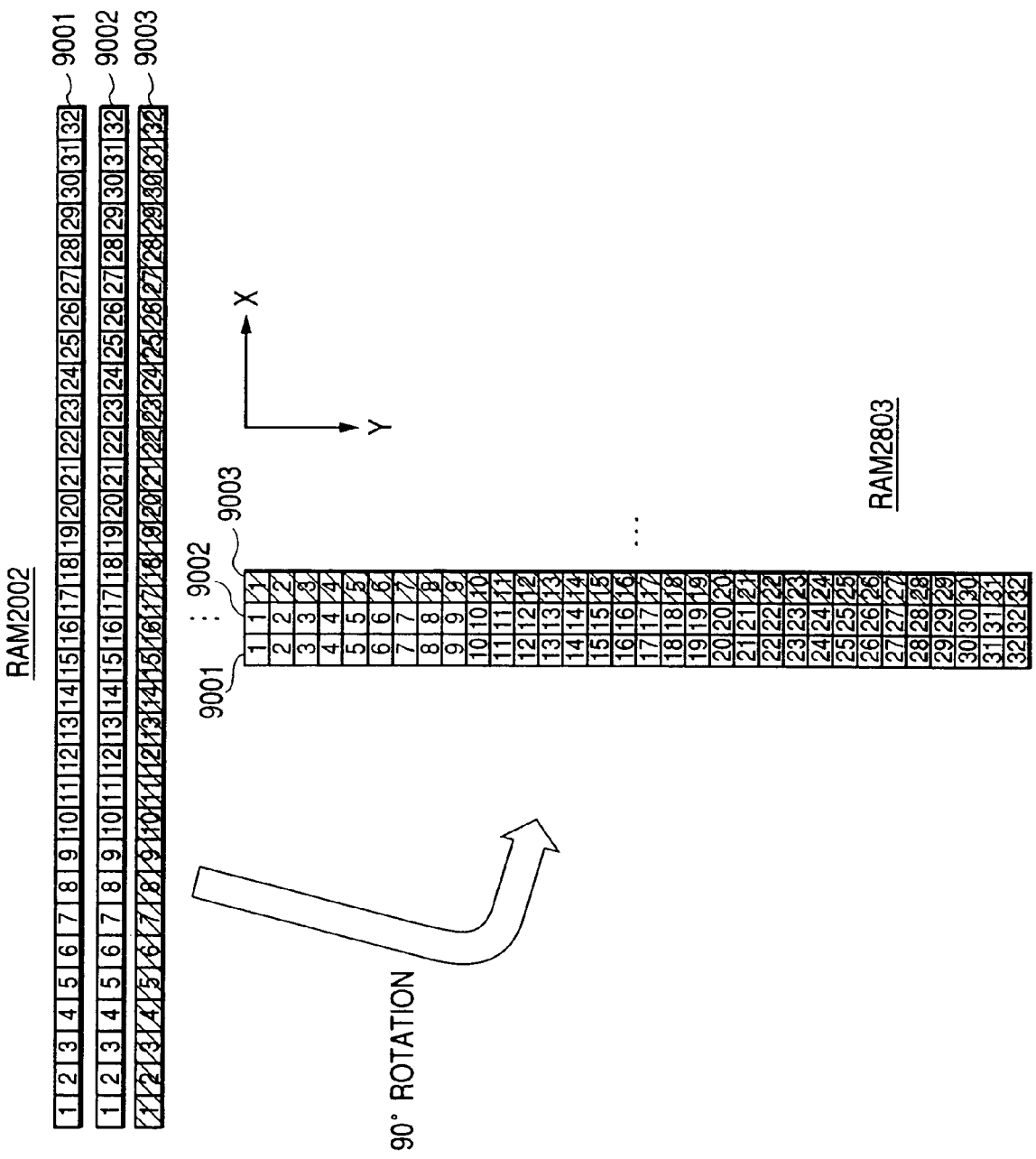
FIG. 10 is a diagram (part two) for explaining image rotation by the image rotation unit in the image forming system to which the present invention is applicable.

The image data 9000 which was transferred by the discontinuous addressing is written at certain addresses on a RAM 2803 such that the image is rotated by a desired angle when the image data is read. For example, when the image is rotated counterclockwise by 90°, 32-bit image data 9001 first transferred is written in the Y direction as shown in FIG. 10. Then, image data 9002 and 9003 are sequentially written in the Y direction in the read order, whereby the image data 9000 is rotated counterclockwise by 90°.

After the rotation (i.e., the writing in the RAM 2803) of the unit image data 9000 of 32×32 (bits) ends, the rotation processing unit 2802 reads the image data from the RAM 2803 in the above-described reading manner and transfers the read image data to the image bus I/F controller 2801.

The image bus I/F controller 2801 which received the rotation-processed image data 9000 transfers the data to the RAM 2002 or each device on the image bus 2008 by continuous addressing.

Such a series of the processes in the image rotation unit 2800 is repeated for each unit image data until a processing request from the controller CPU 2001 ends (i.e., the processes of necessary pages end).

(Device I/F Unit)

Figure 11:
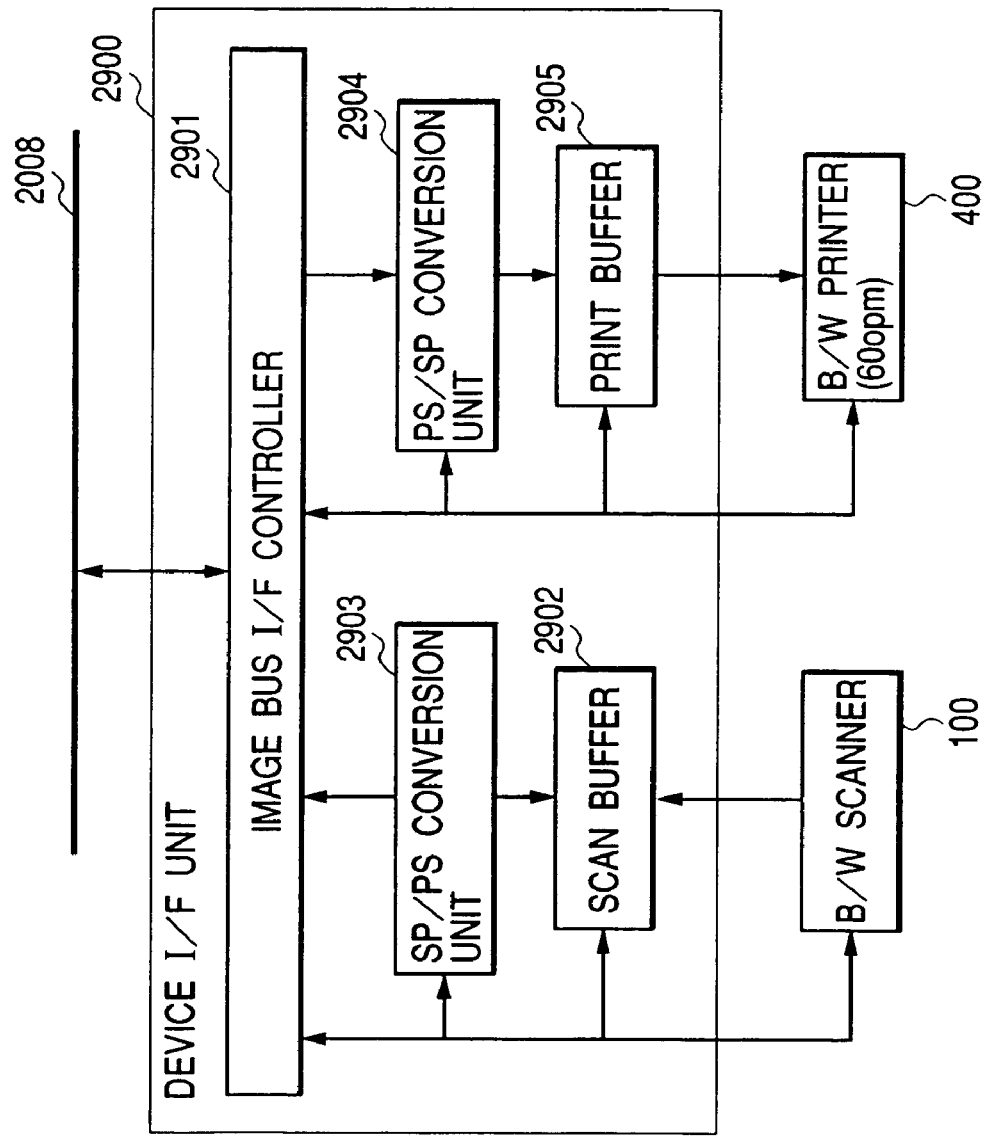
FIG. 11 is a block diagram showing a device interface (I/F) unit in the image forming system to which the present invention is applicable.

FIG. 11 is a block diagram showing the structure of the device I/F unit 2900.

An image bus interface (I/F) controller 2901 which is connected to the image bus 2008 has a function to control its bus access sequence, control each device in the device I/F unit 2900, and generate timing of each device. Further, the image bus I/F controller 2901 generates a control signal to the external B/W scanner 100 and B/W printer 400. A scan buffer 2902 temporarily stores the image data transferred from the B/W scanner 100, and outputs image data in synchronism with the image bus 2008.

A serial-to-parallel/parallel-to-serial (SP/PS) conversion unit 2903 ranges in due order or decomposes the image data temporarily stored in the scan buffer 2902 to convert its data width into the data width capable of being transferred to the image bus 2008. A parallel-to-serial/serial-to-parallel (PS/SP) conversion unit 2904 decomposes or ranges in due order the image data transferred from the image bus 2008 to convert its data width into the data width capable of being stored in a print buffer 2905.

The print buffer 2905 temporarily stores the image data transferred from the image bus 2008, and outputs the image data in synchronism with the B/W printer 400.

Hereinafter, a processing procedure at the image scan will be explained.

The image data transferred from the B/W scanner 100 is temporarily stored in the scan buffer 2902 in synchronism with a timing signal from the B/W scanner 100. Then, in the case where the image bus 2008 is the PCI bus, when the image data equal to or more than 32 bits is stored in the scan buffer 2902, the image data of 32 bits is read from the scan buffer 2902 and transferred to the SP/PS conversion unit 2903 in FIFO (first-in first-out) manner. Then, the image data is converted into the 32-bit image data and transferred to the image bus 2008 through the image bus I/F controller 2901.

In a case where the image bus 2008 is an IEEE1394 (Institute of Electrical and Electronics Engineers standard 1394) bus, the image data in the scan buffer 2902 is read and transferred to the SP/PS conversion unit 2903 in the FIFO manner. Then, the transferred image data is converted into serial image data and further transferred to the image bus 2008 through the image bus I/F controller 2901.

Hereinafter, a processing procedure at the image printing will be explained.

In the case where the image bus 2008 is the PCI bus, the image data of 32 bits transferred from the image bus 2008 is received by the image bus I/F controller 2901, transferred to the PS/SP conversion unit 2904, decomposed into the image data of input data bit number of the B/W printer 400, and temporarily stored in the print buffer 2905.

In the case where the image bus 2008 is the IEEE1394 bus, the serial image data transferred from the image bus 2008 is received by the image bus I/F controller 2901, transferred to the PS/SP conversion unit 2904, decomposed into the image data of input data bit number of the B/W printer 400, and temporarily stored in the print buffer 2905. Then, in synchronism with a timing signal from the B/W printer 400, the image data in the print buffer 2905 is transferred to the B/W printer 400 in FIFO manner.

[One Preferred Embodiment of Present Invention]

Next, one preferred embodiment concerning the image forming system, method and storage medium according to the present embodiment will be concretely explained with reference to FIGS. 12 and 13.

A process for once stopping the operation of the image forming apparatus and enabling to accept other job when an error occurs in the image data generation apparatus will be explained with reference to the flow charts shown in FIGS. 12 and 13. The control shown in FIG. 12 is directed to the process on the image input apparatus side being the image data generation apparatus, and the control shown in FIG. 13 is directed to the process on the image forming apparatus side.

In the present embodiment, it is assumed that the image data of the original read by the ADF of the B/W scanner 100 is transmitted to other remote-located apparatus such as the B/W printer 500 through the Ethernet 1000, and that the user setting concerning remote copying from the scanner to the printer (e.g., setting of data transmission destination selection, setting of operation mode, etc.) is performed at the operation unit 2100 of the B/W scanner 100 to cause the B/W printer 500 to print the transmitted image data. Further, for example, when the MFP integrally containing the B/W scanner 100 and the B/W printer 400 is used, programs representing the flow charts of FIGS. 12 and 13 have been stored in the memory of the image controller 2000 in this MFP. Thus, either one of these programs according to a user's instruction is read and executed by the CPU 2001.

Further, in the present embodiment, it is possible to select a mode (called a clustering mode) in which the image data output from one image data generation apparatus is printed by the plural image forming apparatuses. For example, when an original of 100 pages is read by the B/W scanner 100, the read image data of the first to 50th pages can be printed by the B/W printer 300, and the read image data of the 51st to 100th pages can be printed by the B/W printer 400. Further, for example, when 100 copies of an original of ten pages read by the B/W scanner 100 are output, the 50 copies can be printed by the B/W printer 300, and the remaining 50 copies can be printed by the B/W printer 400.

In any case, when such the clustering mode is executed, an output destination candidate is designated on the operation unit 2001 by the operator. Further, it is set which image forming apparatus should print how many pages (from what page to what page) of the original, or which image forming apparatus should print how many copies of the original. The image controller 2000 transmits the necessary information together with the image data to each image forming apparatus, in accordance with the user's instruction.

On the operation unit 2100 shown in FIG. 2, a start key (not shown) is provided to start the image reading.

Here, the error detection of the image input apparatus on the image input apparatus side will be explained with reference to FIG. 12.

It is judged in a step S1 whether or not there is a key input. If judged that there is the key input, then the flow advances to a step S2 to judged whether or not the start key is depressed. If judged that the start key is not depressed, the flow returns to the step S1 to wait for the key input. Conversely, if judged that the start key is depressed, then the flow advances to a step S3. In the step S3, when an image feed apparatus such as the ADF or the like is provided, the original is fed. It should be noted that, in the present embodiment, a head page processing mode to sequentially feed and read the originals of one sheaf from its head page in due order is executed. Next, in a step S4, it is judged based on a sheet detection result from a not-shown sensor inside the ADF whether or not a feeder jam occurs.

If judged in the step S4 that the feeder jam occurs, then error information representing that the feeder jam occurs is set as the data to be transmitted to the apparatus to which the image data should be transmitted, and this error information is actually transmitted to such the apparatus at the data transmission destination (the B/W printer 500 in this example) through the Ethernet 1000 (step S10). In the case where the above clustering mode has been selected on the operation unit 2001, the error information is transmitted through the Ethernet 1000 to each of the plural image forming apparatuses selected based on the operator's setting on the operation unit 2001.

Then, the flow waits for the release of error (e.g., elimination of the jammed original by the operator, resetting of the original on the ADF, or the like) (step S12). When the error is released, the flow returns to the step S3 to restart the job.

On the other hand, if judged in the step S4 that the feeder jam does not occur, then a flow advances to a step S5 to judge whether or not sheet feed ends. Then, if judged in the step S5 that the sheet feed does not end, the flow returns to the step S4. Conversely, if judged in the step S5 that the sheet feed ends, the flow advances to a step S6 to perform the original reading process. After the original is read in the step S6, it is then judged in a step S7 whether or not the memory provided in the image input apparatus and capable of storing the image data is full of the stored data.

If judged in the step S7 that the memory is full of the data, then error information representing that the memory full occurs is set as the data to be transmitted to the apparatus to which the image data should be transmitted, and this error information is actually transmitted to such the apparatus at the data transmission destination (the B/W printer 500 in this example) through the Ethernet 1000 (step S11). In the case where the above clustering mode has been selected on the operation unit 2001, the error information is transmitted through the Ethernet 1000 to each of the plural image forming apparatuses selected based on the operator's setting on the operation unit 2001.

Then, the flow waits for the release of error (step S12). When the error is released, the flow returns to the step S3 to restart the job.

On the other hand, if judged in the step S7 that the memory full does not occur, then a flow advances to a step S8. In the step S8, the image data which was read in the step S6 is transmitted, as the data to be transmitted to the partner, to the data forming apparatus (the B/W printer 500 in this example) being the data transmission object through the Ethernet 1000 together with a job start instruction, the data indicating the operation mode and the like. Next, in a step S9, it is judged whether or not the fed original is the final original. If judged that the fed original is not the final original, the flow returns to the step S3 to continue the original feed.

On the other hand, if judged in the step S9 that the fed original is the final original, end notification information representing that the image data to be transmitted has been transmitted completely is set as the information to be notified to the partner, and this information is actually transmitted to the apparatus at the data transmission destination (the B/W printer 500 in this example) through the Ethernet 1000. Then, the flow returns to the step S1 to wait for a next key input.

As apparent from a series of the processes from the step S3 to again the step S3 through the steps S6, S8 and S9, in the present embodiment, it is controlled to transmit the image data to the image forming apparatus side every time the original of the predetermined unit (e.g., one page) is read from the sheaf of the originals including the plural pages. Thus, it is possible to reduce the load of the image input apparatus and achieve a real-time process.

Next, the process on the image output apparatus side (the B/W printer 500 in this example) will be explained with reference to FIG. 13. In the case where the above clustering mode has been selected on the operation unit 2001 at the image data generation apparatus side, the following process of FIG. 13 is performed independently for each of the plural image forming apparatuses selected based on the operator's setting from the operation unit 2001.

First, in a step S20, it is judged whether or not there is data acceptance (i.e., remote acceptance) from the external apparatus such as the image input apparatus (the B/W scanner 100 in this example) or the like, on the basis of judgment whether or not the data or the like is received from the external apparatus through the Ethernet 1000. If judged in the step S20 that there is the data acceptance, the flow advances to a step S21 to check the content of the received data. Thus, it is judged whether or not the data or the like received from the external apparatus represents an image (e.g., whether the image information or the error information).

If judged in the step S21 that the data received from the external apparatus represents the image, the flow advances to a step S26 to disable other job acceptance.

Concretely, for example, on the basis of the judged result in the step S20, the image data generation apparatus (the B/W scanner 100 in this example) on the output request origin being the remote acceptance object is set to be able to occupy the B/W printer 500. Further, the job acceptance from the image data generation apparatus other than the above image data generation apparatus (the B/W scanner 100) is invalidated (i.e., the image from such the apparatus is set not to be printed). Here, the image data generation apparatus such as the color scanner 200, the server computer 800, the PC 900 or the like corresponds to the image data generation apparatus other than the above image data generation apparatus (the B/W scanner 100). When a fax mode is provided, a fax machine not shown in FIG. 1 capable of communicating with the image forming apparatus is included in such the image data generation apparatus other than the above image data generation apparatus.

Subsequent to the step S26, the image is received (step S27). Then, the image data transferred from the image data generation apparatus on the output request origin is printed on a sheet based on operation mode data also received in correspondence with this image data (step S28).

Figure 12:
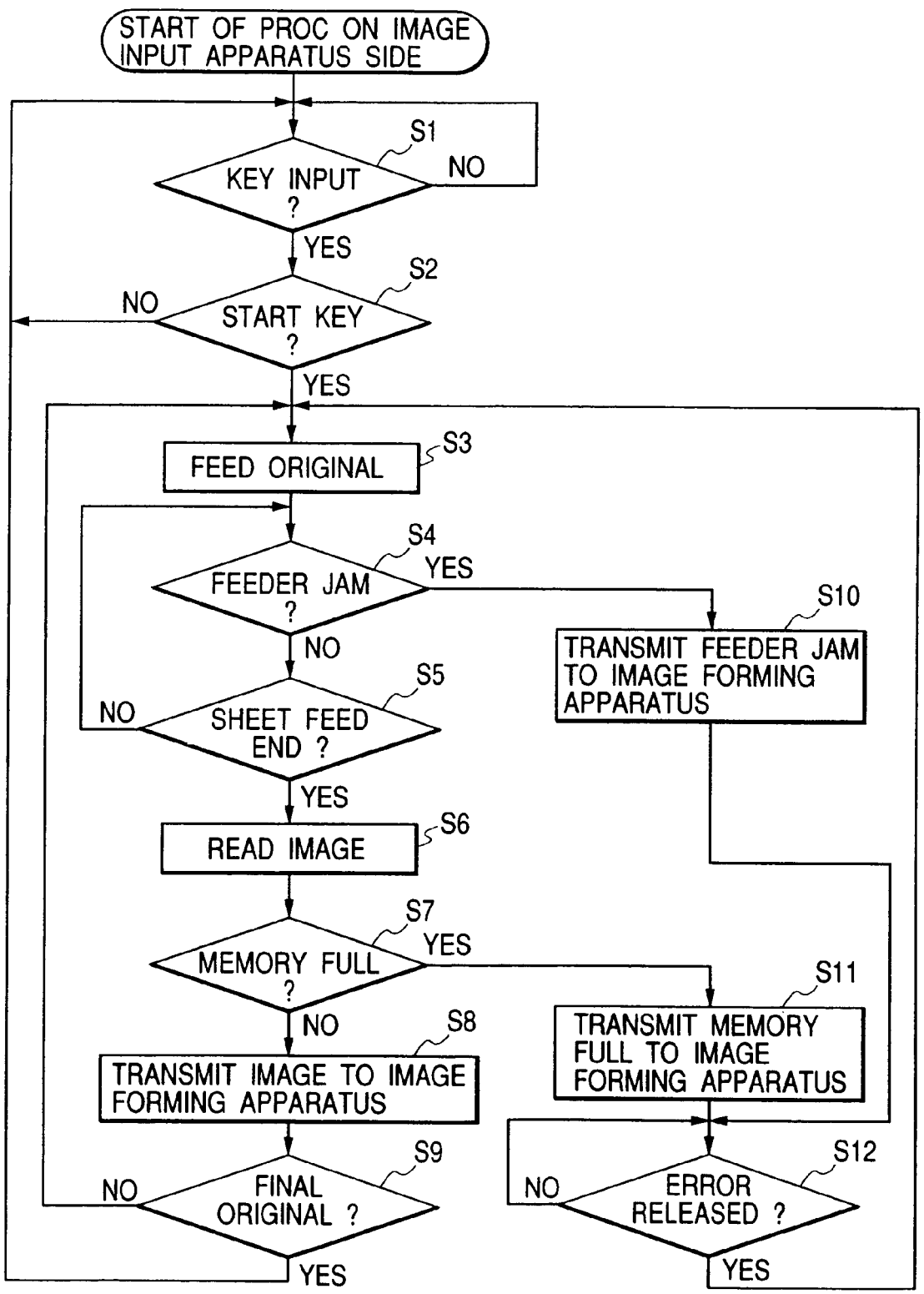
FIG. 12 is a flow chart showing an example of output control according to the present invention.
Figure 13:
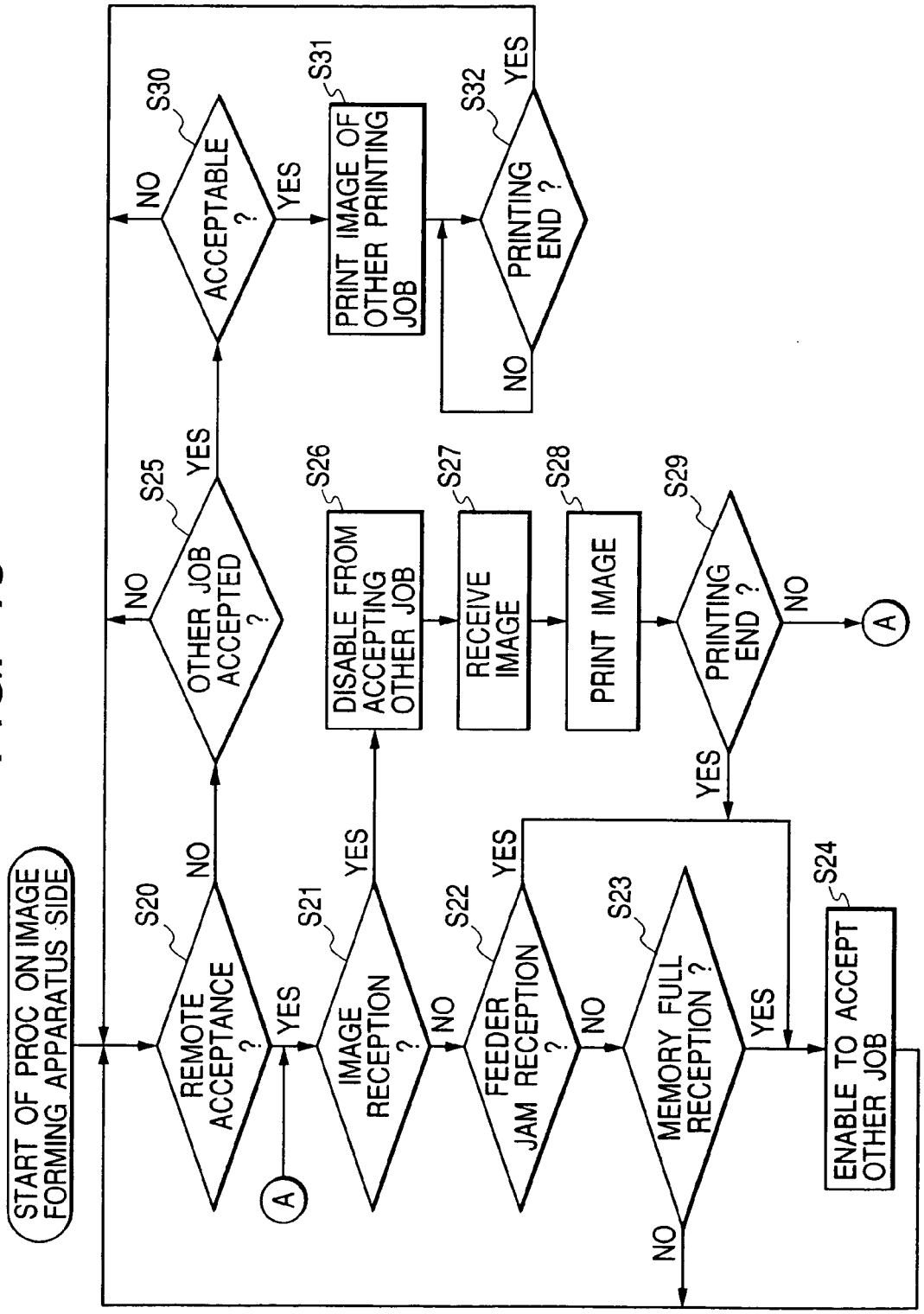
FIG. 13 is a flow chart showing an example of output control according to the present invention.

Then, the flow advances to a step S29 to judge whether or not the image data to be output is printed completely, on the basis of the judgment whether or not an end notification output in the step S9 of FIG. 12 is received (step S29).

If judged in the step S29 that the image data to be output is not printed completely, the flow returns to the step S21.

Conversely, if judged in the step S29 that the image data to be output is printed completely, it enables other job acceptance. For example, the invalidation of the job acceptance from the image data generation apparatus other than the above image data generation apparatus (the B/W scanner 100) is released to enable the printing. Here, the image data generation apparatus such as the color scanner 200, the server computer 800, the PC 900 or the like corresponds to this image data generation apparatus other than the above image data generation apparatus (the B/W scanner 100). When the fax mode is provided, a fax machine not shown in FIG. 1 capable of communicating with the image forming apparatus is included in this image data generation apparatus other than the above image data generation apparatus.

On the other hand, if judged in the step S21 that the data received from the external apparatus does not represent the data (image data) to be formed on the sheet, the flow advances to a step S22 to cope with the error on the image data generation apparatus side on the output request origin.

In the step S22, it is judged in the image input apparatus (the B/W scanner 100 in this example) to which the remote process is requested whether or not the feeder jam (feeder jam reception) occurs, according as the data received in the step S20 is the error information which is output from the image data generation apparatus side in the step S10 of FIG. 12 and represents that the feeder jam occurs.

If judged in the step S22 that the feeder jam occurs, the flow advances to a step S24 to enable the other job acceptance. For example, the invalidation of the job acceptance from the image data generation apparatus other than the above image data generation apparatus (the B/W scanner 100) is released to set a useful or efficient state, such that the image sent from the apparatus other than the image data generation apparatus in which the error occurred can be printed. Here, the image data generation apparatus such as the color scanner 200, the server computer 800, the PC 900 or the like corresponds to this image data generation apparatus other than the above image data generation apparatus (the B/W scanner 100). When the fax mode is provided, a fax machine capable of communicating with the image forming apparatus is included in this image data generation apparatus other than the above image data generation apparatus. In this case, although the image data transmitted from the image data generation apparatus in which the error occurred is not printed completely, the image printing process instructed by such the image data generation apparatus ends. After the error is eliminated in the step S12 of FIG. 12, it is controlled to restart this job which ended on the way. When other job is accepted and executed on the image formation apparatus side during the period from interruption of that job to restart thereof, it is scheduled to execute the once-interrupted job after the currently executed job ends.

On the other hand, if judged in the step S22 that the feeder jam does not occur, the flow advances to a step S23.

In the step S23, it is judged whether or not memory full of the image input apparatus (the B/W scanner 100 in this case) from which the remote process is requested is received (i.e., whether or not memory-full reception is performed). Such judgment is performed by judging whether or not the data received in the step S20 is the error information output from the image data generation apparatus side in the step S11 of FIG. 12 and representing that the memory full occurs.

If judged in the step S23 that the memory full is received, the flow advances to the step S24 to enable the other job acceptance, and then the flow returns to the step S20. Conversely, if judged in the step S23 that the memory full is not received, the flow directly returns to the step S20.

On the other hand, if judged in the step S20 that there is no data acceptance, the flow advances to a step S25 to judge whether or not other job (e.g., a local copying job, a printing job in a printing standby state or the like when the B/W printer 500 is the MFP) is accepted from the apparatus other than the image input apparatus. If judged in the step S25 that other job is not accepted, the flow returns to the step S20, while if judged that other job is accepted, the flow advances to a step S30 to judge whether or not other job is acceptable. If judged that other job is not acceptable, the flow returns to the step S20, while if judged that other job is acceptable, the flow advances to a step S31 to print other job. Then, the flow advances to a step S32 to wait for printing end. When the printing ends, the flow returns to the step S20.

In the above embodiment, the case where the error occurred on the image data generation apparatus side is the feeder jam and the case where the memory full occurs were explained. However, it is apparent that same method as above is applicable to all errors in the apparatuses. Further, it may be controlled that, on the image data generation apparatus side from which the remote process is requested, according as an operator's cancel instruction or stop instruction is input from the operation unit 2100, information representing the input of such the instruction is output from the image data generation apparatus to the image forming apparatus through the Ethernet 1000, and on the image forming apparatus side an acceptance inhibition state for other job is released according to reception of such the information.

Other Embodiments

As described above, the present invention is applicable to a system structured by plural apparatuses (e.g., a host computer, an interface device, a reader, a printer, etc.).

The present invention includes a case where a program code of software to achieve the function of the above embodiment is supplied to a computer in an apparatus or a system connected to various devices to achieve the function of the above embodiment, and the computer (CPU or MPU) in the apparatus or the system actually operates the various devices in accordance with the stored program.

In this case, the program code itself achieves the function of the above embodiment, whereby the program code itself and a means to supply the program code to the computer (e.g., a storage medium storing the program code) constitute the present invention.

As the storage medium for storing such the program code, e.g., a floppy disk, a hard disk, an optical disk, a magnetooptical disk, a CD-ROM, a magnetic tape, a non-volatile memory card, a ROM, or the like can be used.

Further, it is needless to say that the embodiment of the present invention includes the program code not only when the computer executes the supplied program code to achieve the function of the above embodiment, but also when the program code cooperates with an OS (operating system) running on the computer or other application software to achieve the function of the above embodiment.

Further, the present invention includes a case where the supplied program code is once stored in a memory provided in a function expansion board of the computer or a function expansion unit connected to the computer, and a CPU or the like provided in the function expansion board or the function expansion unit executes all or a part of the actual process according to an instruction of the program code, whereby the function of the above embodiment is achieved by such the process.

As explained above, according to the present embodiment, in the system that the plural apparatuses remotely located mutually can perform the data communication through the transmission medium, it is possible to prevent the drawback that, e.g., while the job accepted from one image data generation apparatus is being printed by one image forming apparatus, when an error occurs in this image data generation apparatus, this image forming apparatus keeps being occupied by this error-occurred image data generation apparatus, whereby other jobs can not be accepted, and thus other users can not use this image forming apparatus, traffic increases, and the like. Thus, it is possible to increase productivity of the entire system, smoothly operate the system, and the like. Further, in the case where the above error-occurred image data generation apparatus has selected the clustering mode, it is possible to prevent the drawback that the plural image forming apparatuses keep being occupied by the single image data generation apparatus. Thus, in this case, the above significant effects further rise.

Although the present invention has been explained with the preferred embodiments, the present invention is not limited to these embodiments. Namely, it is obvious that various modifications and changes are possible in the present invention without departing from the spirit and scope of the appended claims.

What is claimed is:

1. A printing device comprising:
an input unit adapted to input data;
a memory unit adapted to store a plurality of data including data inputted by said input unit;
a printer unit adapted to print data stored in said memory unit;
a transmitter adapted to transmit data stored in said memory unit to another printing device;
an acceptor adapted to accept a request for an allotted processing wherein a printing operation of data which is input by said input unit is allotted among said printing device and the other printing device; and
a controller adapted to cause said printer unit to perform a printing operation for the allotted processing, and cause said transmitter to transmit data necessary for the allotted processing to the other printing device, in the absence of an error about the allotted processing in said printing device,
wherein said controller causes said printer unit to perform another printing operation, different from the printing operation for the allotted processing, in the presence of the error in said printing device.

2. A device according to claim 1, wherein the error includes at least one of an input error in the input unit and a memory error in the memory unit.

3. A device according to claim 1, wherein the other printing operation, different from the printing operation for the allotted processing, includes at least a printing operation for printing external data from an external device which includes at least one of a remote scanner and a remote computer and another printing device.

4. A printing device comprising:
an input unit adapted to input data;
a memory unit adapted to store a plurality of data including data inputted by said input unit;
a printer unit adapted to print data stored in said memory unit;
a transmitter adapted to transmit data stored in said memory unit to another printing device;
an acceptor adapted to accept a request for an allotted processing wherein a printing operation of data which is input by said input unit is allotted among said printing device and the other printing device; and
a controller adapted to cause said printer unit to start a printing operation for the allotted processing, and cause said transmitter to transmit data necessary for the allotted processing to the other printing device, in the absence of an error about the allotted processing in said printing device,
wherein said controller causes said printer unit to stop the printing operation for the allotted processing if the error occurs in said printing device, and then causes said printer unit to perform another printing operation, different from the printing operation for the allotted processing.

5. A printing device comprising:
an input unit adapted to input data;
a memory unit adapted to store a plurality of data including data inputted by said input unit;
a printer unit adapted to print data stored in said memory unit;
a transmitter adapted to transmit data stored in said memory unit to another printing device;
an acceptor adapted to accept a request for an allotted processing wherein a printing operation of data which is input by the input unit is allotted among said printing device and the other printing device; and
a controller adapted to cause said printer unit to start a printing operation for the allotted processing, and cause said transmitter to transmit data necessary for the allotted processing to the other printing device,
wherein said controller causes said printer unit to stop the printing operation for the allotted processing if the error occurs in said printing device, and then causes said printer unit to start another printing operation, different from the printing operation for the allotted processing, and
wherein said controller causes said printer unit to restart the printing operation for the allotted processing, after the other printing operation is ended in said printing device and the error is removed.

6. A printing device comprising:
an input unit adapted to input data;
a memory unit adapted to store a plurality of data including data inputted by said input unit;
a transmitter adapted to transmit data stored in said memory unit to another printing device;
an acceptor adapted to accepted a request for an allotted processing wherein a printing operation of data which is input by said input unit is allotted among said printing device and the other printing device; and
a controller adapted to cause said printer unit to perform the printing operation for the allotted processing and cause said transmitter to transmit data necessary for the allotted processing to the other printing device in the absence of input of a predetermined instruction about the allotted processing by an operator to said printing device,
wherein said controller causes said printer unit to perform another printing operation, different from the printing operation for the allotted processing in the presence of input of the predetermined instruction by the operator to said printing device.

7. A device according to claim 6, wherein the predetermined instruction from the operator, which is input in said printing device, includes at least one of a cancel instruction for canceling the printing operation for the allotted processing and a stop instruction for stopping the printing operation for the allotted processing.

8. A printing device comprising:
an input unit adapted to input data;
a memory unit adapted to store a plurality of data including data inputted by said input unit;
a printing unit adapted to print data stored in said memory unit;
a transmitter adapted to transmit data stored in said memory unit to another printing device;
an acceptor adapted to accept a request for an allotted processing wherein a printing operation of data which is input by said input unit is allotted among said printing device and the said input unit is allotted among said printing device and the other printing device; and a controller adapted to cause said printer unit to start the printing operation for the allotted processing and cause said transmitter to transmit data necessary for the allotted processing to the other printing device, in the absence of input of a predetermined instruction about the allotted processing by an operator to said printing device, wherein said controller causes said printer unit to stop the printing operation for the allotted processing if the predetermined instruction in said printing device is input, and then causes said printer unit to perform another printing operation, different from the printing operation for the allotted processing.

9. A printing device comprising:

a receiver adapted to receive data from another printing device;

a memory unit adapted to store a plurality of data including data from the other printing device;

a printer unit adapted to print data stored in said memory unit;

an acceptor adapted to accept a request for an allotted processing wherein a printing operation of data which is input in the other printing device is allotted among the other printing device and said printing device; and a controller adapted to cause said printer unit to perform a printing operation of data received from the other printing device for the allotted processing, in the absence of an error about the allotted processing in the other printing device, wherein said controller causes said printer unit to perform another printing operation, different from the printing operation for the allotted processing, in the presence of the error in the other printing device.

10. A device according to claim 9, wherein the other printing operation, different from the printing operation for the allotted processing, includes at least a printing operation for printing external data from an external device which includes at least one of a remote scanner and a remote computer and another printing device.

11. A printing device comprising:

a receiver adapted to receive data from another printing device;

a memory unit adapted to store a plurality of data including data from the other printing device;

a printer unit adapted to print data stored in said memory unit;

an acceptor adapted to accept a request for an allotted processing wherein a printing operation of data which is input in the other printing device is allotted among the other printing device and said printing device;

a controller adapted to cause said printer unit to start a printing operation of data received from the other printing device for the allotted processing, in the absence of an error about the allotted processing in the other printing device, wherein said controller causes said printer unit to stop the printing operation for the allotted processing if the error occurs in the other printing device, and then causes said printer unit to perform another printing operation, different from the printing operation for the allotted processing.

12. A printing device comprising:

a receiver adapted to receive data from another printing device;

a memory unit adapted to store a plurality of data including data from the other printing device;

a printer unit adapted to print data stored in said memory unit;

an acceptor adapted to accept a request for an allotted processing wherein a printing operation of data which is input in the other printing device is allotted among the other printing device and said printing device; and a controller adapted to cause said printer unit to start a printing operation of data received from the other printing device for the allotted processing, in the absence of an error about the allotted processing in the other printing device, wherein said controller causes said printer unit to stop the printing operation for the allotted processing if the error occurs in the other printing device, and then causes said printer unit to start another printing operation, different from the printing operation for the allotted processing, and said controller causes said printer unit to restart the printing operation for the allotted processing, after the other printing operation is ended in said printing device, when the printing operation for the allotted processing is again able to be performed in the other printing device and the error is removed.

13. A printing device comprising:

a receiver adapted to receive data from another printing device;

a memory unit adapted to store a plurality of data including data from the other printing device;

a printer unit adapted to print data stored in said memory unit;

an acceptor adapted to accept a request for an allotted processing wherein a printing operation of data which is input in the other printing device is allotted among the other printing device and said printing device; and in the absence of input of a predetermined instruction about the allotted processing by operator in the other printing device, wherein said controller causes said printer unit to perform another printing operation, different from the printing operation for the allotted processing, in the presence of input of the predetermined instruction by operator the other printing device.

14. A device according to claim 13 wherein the error in the other printing device includes at least one of an input error in the other printing device and a memory error in the other printing device.

15. A device according to claim 13 wherein the predetermined instruction from the operator, which is input to the other printing device, includes at least one of a cancel instruction for canceling the printing operation for the allotted processing and a stop instruction for stopping the printing operation for the allotted processing.

16. A printing device comprising:

a receiver adapted to receive data from another printing device;

a memory unit adapted to store a plurality of data including data from the other printing device;

a printer unit adapted to print data stored in said memory unit;

an acceptor adapted to accept a request for an allotted processing wherein a printing operation of data which is input in the other printing device is allotted among the other printing device and said printing device; and a controller adapted to cause said printer unit to start the printing operation of data received from the other printing device for the allotted processing, in the absence of input of a predetermined instruction about the allotted processing by an operator to the other printing device,
wherein said controller causes the printer unit to stop the printing operation for the allotted processing if the predetermined instruction in the other printing device is input, and then causes said printer unit to perform another printing operation, different from the printing operation for the allotted processing.

17. A method for a printing device which includes an input unit adapted to input data, a memory unit that can store a plurality of data including data from the input unit, and a printer unit adapted to print data of the memory unit and includes a transmitter that can transmit data stored in the memory unit to another printing device, said method comprising the steps of:
   accepting a request for an allotted processing wherein a printing operation of data which is input by the input unit is allotted among the printing device and the other printing device;
   causing the printer unit to perform a printing operation for the allotted processing, and causing the transmitter to transmit data necessary for the allotted processing to the other printing device, in the absence of an error about the allotted processing in the printing device; and
   causing the printer unit to perform another printing operation, different from the printing operation for the allotted processing, in the presence of the error in the printing device.

18. A method for a printing device which includes an input unit adapted to input data, a memory unit adapted to store a plurality of data including data from the input unit, and a printer unit adapted to print data of the memory unit and includes a transmitter adapted to transmit data stored in the memory unit to another printing device, said method comprising the steps of:
   accepting a request for an allotted processing wherein a printing operation of data which is input by the input unit is allotted among the printing device and the other printing device;
   causing the printer unit to start a printing operation for the allotted processing, and causing the transmitter to transmit data necessary for the allotted processing to the other printing device, in the absence of an error about the allotted processing in the printing device; and
   causing the printer unit to stop the printing operation for the allotted processing if the error occurs in the printing device, and then causing the printer unit to perform another printing operation, different from the printing operation for the allotted processing.

19. A method for a printing device which includes an input unit adapted to input data, a memory unit adapted to store a plurality of data including data from the input unit, and a printer unit that can print data of the memory unit and includes a transmitter that can transmit data stored in the memory unit to another printing device, said method comprising the steps of:
   accepting a request for an allotted processing wherein a printing operation of data which is input by the input unit is allotted among the printing device and the other printing device;
   causing the printer unit to start a printing operation for the allotted processing, and causing the transmitter to transmit data necessary for the allotted processing to the other printing device, in the absence of an error about the allotted processing in the printing device;
   causing the printer unit to stop the printing operation for the allotted processing if the error occurs in the printing device and then causing the printer unit to start another printing operation, different from the printing operation for the allotted processing; and
   causing the printer unit to restart the printing operation for the allotted processing after the other printing operation is ended in the printing device, and the error is removed.

20. A method for a printing device which includes a receiver adapted to receive data from another printing device, a memory unit adapted to store a plurality of data including data from the other printing device, and a printer unit adapted to print data of the memory unit, said method comprising the steps of:
   accepting a request for an allotted processing wherein a printing operation of data which is input in the other printing device is allotted among the other printing device and the printing device;
   causing the printer unit to perform a printing operation of data received from the other printing device for the allotted processing, in the absence of an error about the allotted processing in the other printing device; and
   causing the printer unit to perform another printing operation, different from the printing operation for the allotted processing, in the presence of the error in the other printing device.

21. A method for a printing device which includes a receiver adapted to receive data from another printing device, a memory unit adapted to store a plurality of data including data from the other printing device, and a printer unit adapted to print data stored in the memory unit, said method comprising the steps of:
   accepting a request for an allotted processing wherein a printing operation of data which is input in the other printing device is allotted among the other printing device and the printing device;
   causing the printer unit to start a printing operation of data received from the other printing device for the allotted processing, in the absence of an error about the allotted processing in the other printing device; and
   causing the printer unit to stop the printing operation for the allotted processing if the error occurs in the other printing device, and then causing the printer unit to perform another printing operation, different from the printing operation for the allotted processing.

22. A method for a printing device which includes a receiver adapted to receive data from another printing device, a memory unit adapted to store a plurality of data including data from the other printing device, and a printer unit that can print data stored in the memory unit, said method comprising the steps of:
   accepting a request for an allotted processing wherein a printing operation of data which is input in the other printing device is allotted among the other printing device and the printing device;
   causing the printer unit to start a printing operation of data received from the other printing device for the allotted processing, in the absence of an error about the allotted processing in the other printing device;
   causing the printer unit to stop the printing operation for the allotted processing if the error occurs in the other printing device, and then causing the printer unit to start another printing operation, different from the printing operation for the allotted processing; and
   causing the printer unit to restart the printing operation for the allotted processing, after the other printing operation is ended in the printing device and the error is removed.

23. A printing device comprising:

an input unit adapted to input data;

a memory unit adapted to store a plurality of data including data inputted by said input unit;

a printer unit adapted to print data stored in said memory unit;

a transmitter adapted to transmit data stored in said memory unit to another printing device;

an acceptor adapted to accept a request for an allotted processing wherein a printing operation of data which is input by said input unit is allotted among said printing device and the other printing device; and a controller adapted to cause said printer unit to start the printing operation for the allotted processing and cause said transmitter to transmit data necessary for the allotted processing to the other printing device, in the absence of input of a predetermined instruction about the allotted processing by an operator to said printing device, wherein said controller causes said printer unit to stop the printing operation for the allotted processing if the predetermined instruction in said printing device is input, and then causes said printer unit to perform another printing operation, different from the printing operation for the allotted processing, wherein said controller causes said printer unit to restart the printing operation for the allotted processing, after the other printing operation is ended in said printing device.

24. A printing device comprising:

a receiver adapted to receive data from another printing device;

a memory unit adapted to store a plurality of data including data from the other printing device;

a printer unit adapted to print data stored in said memory unit;

an acceptor adapted to accept a request for an allotted processing wherein a printing operation of data which is input in the other printing device is allotted among the other printing device and said printing device; and a controller adapted to cause said printer unit to start the printing operation of data received from the other printing device for the allotted processing, in the absence of input of a predetermined instruction about the allotted processing by an operator to the other printing device, wherein said controller causes the printer unit to stop the printing operation for the allotted processing if the predetermined instruction in the other printing device is input, and then causes said printer unit to perform another printing operation, different from the printing operation for the allotted processing, wherein said controller causes said printer unit to restart the printing operation for the allotted processing, after the other printing operation is ended in said printing device.

25. A method for a printing device which includes an input unit adapted to input data, a memory unit that can store a plurality of data including data from the input unit, and a printer unit adapted to print data of the memory unit and includes a transmitter that can transmit data stored in the memory unit to another printing device, said method comprising the steps of:

accepting a request for an allotted processing wherein a printing operation of data which is input by the input unit is allotted among the printing device and the other printing device;

causing the printer unit to perform a printing operation for the allotted processing, and causing the transmitter to transmit data necessary for the allotted processing to the other printing device, in the absence of input of a predetermined instruction about the allotted processing by an operator to the printing device; and causing the printer unit to perform another printing operation, different from the printing operation for the allotted processing, in the presence of input of the predetermined instruction by operator in the printing device.

26. A method for a printing device which includes an input unit adapted to input data, a memory unit that can store a plurality of data including data from the input unit, and a printer unit adapted to print data of the memory unit and includes a transmitter that can transmit data stored in the memory unit to another printing device, said method comprising the steps of:

accepting a request for an allotted processing wherein a printing operation of data which is input by the input unit is allotted among the printing device and the other printing device;

causing the printer unit to start a printing operation for the allotted processing, and causing the transmitter to transmit data necessary for the allotted processing to the other printing device, in the absence of input of a predetermined instruction about the allotted processing by an operator to the printing device; and causing the printer unit to stop the printing operation for the allotted processing if the predetermined instruction in the printing device is input, and then causing the printer unit to perform another printing operation, different from the printing operation for the allotted processing.

27. A method for a printing device which includes an input unit adapted to input data, a memory unit that can store a plurality of data including data from the input unit, and a printer unit adapted to print data of the memory unit and includes a transmitter that can transmit data stored in the memory unit to another printing device, said method comprising the steps of:

accepting a request for an allotted processing wherein a printing operation of data which is input by the input unit is allotted among the printing device and the other printing device;

causing the printer unit to start a printing operation for the allotted processing, and causing the transmitter to transmit data necessary for the allotted processing to the other printing device, in the absence of input of a predetermined instruction about the allotted processing by an operator to the printing device;

causing the printer unit to stop the printing operation for the allotted processing if the predetermined instruction in the printing device is input, and then causing the printer unit to perform another printing operation, different from the printing operation for the allotted processing; and causing the printer unit to restart the printing operation for the allotted processing, after the other printing operation is ended in the printing device.

28. A method for a printing device which includes a receiver adapted to receive data from another printing device, a memory unit adapted to store a plurality of data including data from the other printing device, and a printer unit adapted to print data of the memory unit, said method comprising the steps of:

accepting a request for an allotted processing wherein a printing operation of data which is input in the other printing device is allotted among the other printing device and the printing device;

causing the printer unit to perform the printing operation of data received from the other printing device for the allotted processing in the absence of input of a predetermined instruction about the allotted processing by an operator to the other printing device; and causing the printer unit to perform another printing operation, different from the printing operation for the allotted processing in the presence of input of the predetermined instruction by the operator to the other printing device.

29. A method for a printing device which includes a receiver adapted to receive data from another printing device, a memory unit adapted to store a plurality of data including data from the other printing device, and a printer unit adapted to print data of the memory unit, said method comprising the steps of:

accepting a request for an allotted processing wherein a printing operation of data which is input in the other printing device is allotted among the other printing device and the printing device;

causing the printer unit to start the printing operation of data received from the other printing device for the allotted processing, in the absence of input of a predetermined instruction about the allotted processing by an operator to the other printing device; and causing the printer unit to stop the printing operation for the allotted processing if the predetermined instruction in the other printing device is input, and then causing the printer unit to perform another printing operation, different from the printing operation for the allotted processing.

30. A method for a printing device which includes a receiver adapted to receive data from another printing device, a memory unit adapted to store a plurality of data including data from the other printing device, and a printer unit adapted to print data of the memory unit, said method comprising the steps of:

accepting a request for an allotted processing wherein a printing operation of data which is input in the other printing device is allotted among the other printing device and the printing device;

causing the printer unit to start the printing operation of data received from the other printing device for the allotted processing, in the absence of input of a predetermined instruction about the allotted processing by an operator to the other printing device;

causing the printer unit to stop the printing operation for the allotted processing if the predetermined instruction in the other printing device is input, and then causing the printer unit to perform another printing operation, different from the printing operation for the allotted processing; and causing the printer unit to restart the printing operation for the allotted processing, after the other printing operation is ended in the printing device.

* * * * *

UNITED STATES PATENT AND TRADEMARK OFFICE
CERTIFICATE OF CORRECTION

PATENT NO. : 7,408,669 B2
APPLICATION NO. : 11/028184
DATED : August 5, 2008
INVENTOR(S) : Satoshi Kaneko It is certified that error appears in the above-identified patent and that said Letters Patent is hereby corrected as shown below:

ON THE TITLE PAGE [45]:

Date of Patent, "Aug. 5, 2008" should read --*Aug. 5, 2008--.

ON THE TITLE PAGE [*]:

Notice, --This patent is subject to a terminal disclaimer-- should be inserted.

COLUMN 1:

Line 17, "apparatus," should read --apparatuses,--;
Line 35, "scanner, computer" should read --scanners, computers,--;
Line 37, "the" should be deleted;
Line 45, "recording" should read --storage--; and
Line 51, "recording" should read --storage--.

COLUMN 3:

Line 31, "apparatus" (both occurrences) should read --apparatuses--;
Line 49, "etc. and" should read --etc.,--; and
Line 50, "mode" should read --mode,--.

COLUMN 5:

Line 6, "to table conversion" should be deleted.

COLUMN 6:

Line 30, "then," should read --that,--.

COLUMN 8:

Line 7, "enabling" should read --enabling it-- and "job" should read --jobs--;
Line 16, "apparatus" should read --apparatuses--; and
Line 57, "judged" should read --judge--.

UNITED STATES PATENT AND TRADEMARK OFFICE
CERTIFICATE OF CORRECTION

PATENT NO. : 7,408,669 B2
APPLICATION NO. : 11/028184
DATED : August 5, 2008
INVENTOR(S) : Satoshi Kaneko It is certified that error appears in the above-identified patent and that said Letters Patent is hereby corrected as shown below:

COLUMN 9:

Line 5, "the" (first occurrence) should be deleted; and
Line 32, "the" should be deleted.

COLUMN 10:

Line 33, "the" (second occurrence) should be deleted; and
Line 40, "the" (second occurrence) should be deleted.

COLUMN 11:

Line 31, "the" should be deleted; and
Line 34, "other" should read --another--.

COLUMN 12:

Line 14, "the" should be deleted.
Line 33, "magnetoop-" should read --magneto-op- --; and
Line 51, "the" (second occurrence) should be deleted.

COLUMN 14:

Line 33, "accepted" should read --accept--.

COLUMN 15:

Line 50, "device;" (second occurrence) should read --device; and--.

COLUMN 16:

Line 34, "device; and in" should read --device, in--;
Line 36, "by operator in" should read --by an operator of--;
Line 41, "by operator" should read --by an operator of--;
Line 43, "claim 13" should read --claim 13,--; and
Line 47, "claim 13" should read --claim 13,--.

UNITED STATES PATENT AND TRADEMARK OFFICE
CERTIFICATE OF CORRECTION

PATENT NO. : 7,408,669 B2
APPLICATION NO. : 11/028184
DATED : August 5, 2008
INVENTOR(S) : Satoshi Kaneko It is certified that error appears in the above-identified patent and that said Letters Patent is hereby corrected as shown below:

COLUMN 17:

Line 13, "includes" should read --including--; and
Line 33, "includes" should read --including--.

COLUMN 19:

Line 60, "includes" should read --including--.

COLUMN 20:

Line 6, "operator to" should read --operator of--;
Line 10, "by operator in" should read --by the operator of--;
Line 15, "includes" should read --including--; and
Line 37, "includes" should read --including--.

COLUMN 21:

Line 5, "processing" should read --processing,--; and
Line 10, "processing" should read --processing,--.

Signed and Sealed this

Tenth Day of February, 2009

JOHN DOLL
*Acting Director of the United States Patent and Trademark Office*